(12) United States Patent
Whitfill et al.

(10) Patent No.: US 10,982,125 B2
(45) Date of Patent: Apr. 20, 2021

(54) APPLICATION OF METAL OXIDE-BASED CEMENTS IN WELLBORES

(71) Applicant: Halliburton Energy Services, Inc., Houston, TX (US)

(72) Inventors: Donald L. Whitfill, Kingwood, TX (US); Sharath Savari, Dharah (SA); Reem Alburaikan, Al-Khobar (SA); Waseem Abdulrazzaq, Dhahran Eastern (SA); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/483,301

(22) PCT Filed: Dec. 13, 2017

(86) PCT No.: PCT/US2017/065982
§ 371 (c)(1),
(2) Date: Aug. 2, 2019

(87) PCT Pub. No.: WO2018/160253
PCT Pub. Date: Sep. 7, 2018

(65) Prior Publication Data
US 2020/0010751 A1 Jan. 9, 2020

Related U.S. Application Data

(60) Provisional application No. 62/466,923, filed on Mar. 3, 2017, provisional application No. 62/466,900, filed on Mar. 3, 2017.

(51) Int. Cl.
*E21B 33/138* (2006.01)
*C09K 8/42* (2006.01)
(Continued)

(52) U.S. Cl.
CPC .............. *C09K 8/424* (2013.01); *C04B 14/10* (2013.01); *C04B 28/32* (2013.01); *C04B 40/065* (2013.01);
(Continued)

(58) Field of Classification Search
CPC ....... C04B 14/10; C04B 28/32; C09K 40/065; C09K 8/40; C09K 8/467; E21B 21/003; E21B 33/138
See application file for complete search history.

(56) References Cited

U.S. PATENT DOCUMENTS 5,532,212 A 7/1996 Patel
7,363,976 B1 * 4/2008 Burts, Jr. ............ C04B 40/0666
166/285
(Continued)

FOREIGN PATENT DOCUMENTS

GB 2541548 A 2/2017
MX 2011003937 A 5/2011
(Continued)

OTHER PUBLICATIONS

International Search Report and Written Opinion issued in related PCT Application No. PCT/US2017/065982 dated Apr. 16, 2018, 21 pages.
(Continued)

*Primary Examiner* — Silvana C Runyan
(74) *Attorney, Agent, or Firm* — Tenley Krueger; Baker Botts L.L.P.

(57) ABSTRACT

Methods for using cement compositions in subterranean formations are provided. In some embodiments, the methods comprise introducing a first treatment fluid comprising a first base fluid and a metal oxide into a wellbore penetrating at least a portion of a subterranean formation; introducing a spacer fluid into the wellbore that separates the first treat-
(Continued)

ment fluid from at least a second treatment fluid; introducing the second treatment fluid into the wellbore, wherein the second treatment fluid comprises a second base fluid and a soluble salt; allowing the first treatment fluid to contact the second treatment fluid to form a cement mixture; and allowing the cement mixture to at least partially set.

20 Claims, 10 Drawing Sheets

(51) Int. Cl.
*C04B 14/10* (2006.01)
*C04B 28/32* (2006.01)
*C04B 40/06* (2006.01)
*C09K 8/40* (2006.01)
*C09K 8/467* (2006.01)
*E21B 21/00* (2006.01)

(52) U.S. Cl.
CPC ............... *C09K 8/40* (2013.01); *C09K 8/467* (2013.01); *E21B 21/003* (2013.01); *E21B 33/138* (2013.01)

(56) References Cited

U.S. PATENT DOCUMENTS

| | | | |
|---|---|---|---|
| 7,431,086 B2 | 10/2008 | Lewis et al. | |
| 7,654,326 B1 * | 2/2010 | Santra | C04B 28/32 106/684 |
| 7,694,738 B2 | 4/2010 | Reddy et al. | |
| 8,418,763 B1 | 4/2013 | Deen et al. | |
| 9,194,972 B2 | 11/2015 | Van der Zwaag et al. | |
| 2005/0241828 A1 * | 11/2005 | Almond | C09K 8/42 166/292 |
| 2007/0125534 A1 | 6/2007 | Reddy et al. | |
| 2007/0275861 A1 | 11/2007 | Almond | |
| 2008/0169100 A1 * | 7/2008 | Lewis | C09K 8/467 166/293 |
| 2008/0171673 A1 | 7/2008 | Lewis et al. | |
| 2008/0171674 A1 | 7/2008 | Lewis et al. | |
| 2009/0038855 A1 * | 2/2009 | Ravi | C09K 8/03 175/65 |
| 2012/0013335 A1 | 1/2012 | Saasen et al. | |
| 2014/0076561 A1 | 3/2014 | Reddy | |
| 2017/0073567 A1 | 3/2017 | Reddy et al. | |

FOREIGN PATENT DOCUMENTS

| | | |
|---|---|---|
| MX | 2016013194 A | 1/2017 |
| SU | 1002523 A1 | 3/1983 |
| WO | 2014/127334 A1 | 8/2014 |
| WO | 2017/034588 A1 | 3/2017 |

OTHER PUBLICATIONS

Search Report issued in related Russian Patent Application No. 2019119778 dated Apr. 22, 2020, 2 pages.

* cited by examiner

APPLICATION OF METAL OXIDE-BASED CEMENTS IN WELLBORES

CROSS-REFERENCE TO RELATED APPLICATION

The present application is a U.S. National Stage Application of International Application No. PCT/US2017/065982 filed Dec. 13, 2017 which claims priority to U.S. Provisional Patent Application No. 62/466,923 filed Mar. 3, 2017 and U.S. Provisional Patent Application No. 62/466,900 filed Mar. 3, 2017, all of which are incorporated herein by reference in their entirety for all purposes.

BACKGROUND

The present disclosure relates to cement compositions and methods for using the same in subterranean formations. Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, inter alia, drilling fluids, well cleanup fluids, workover fluids, conformance fluids, cementing fluids, gravel pack fluids, acidizing fluids, fracturing fluids, spacer fluids, and the like.

Treatment fluids used in servicing a wellbore may be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid may be more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Treatment techniques may be employed to address fluid loss that occurs during drilling or other downhole operations such as plugging or bridging loss zones. Lost circulation treatments involving various plugging materials such as walnut hulls, mica and cellophane have been used to prevent or lessen the loss of fluids from wellbores. However, such treatments include the potential for damage to subterranean formations as a result of the inability to remove the plugging materials therefrom, and the dislodgement of the plugging materials from highly permeable zones whereby fluid losses subsequently resume. One technique for preventing lost circulation problems has been to temporarily plug voids or permeable zones with Sorel cement compositions.

Sorel cement is a non-hydraulic cement that typically includes a mixture of a metal oxide such as magnesium oxide (burnt magnesia) with a salt such as magnesium chloride. Sorel cements may be removed with minimal damage to subterranean zones or formations by dissolution in acids. Sorel cement generally includes $MgCl_2$ or $MgCl_2.6H_2O$. However, there are variants that can be made with phosphates or sulfates. The $MgCl_2$ chemistry has been applied in the petroleum industry for applications to control water injection into zones that are not the targets of the injection prevention and, more recently, for lost circulation mitigation. Another recent application is to distribute the reactive materials of Sorel cement in a non-aqueous fluid that prevents reaction until it is mixed with water or a water precursor. Current techniques involve pumping the reactive pill down one flow path, such as a drill pipe, while the water or water precursor is pumped down the annular space between the drill pipe and the drill hole wall. However, some of these applications do not work for systems using non-aqueous fluids (e.g., a non-aqueous drilling fluid) because water or a water precursor is needed.

BRIEF DESCRIPTION OF THE DRAWINGS

These drawings illustrate certain aspects of some of the embodiments of the present disclosure and should not be used to limit or define the claims.

Figure 1:
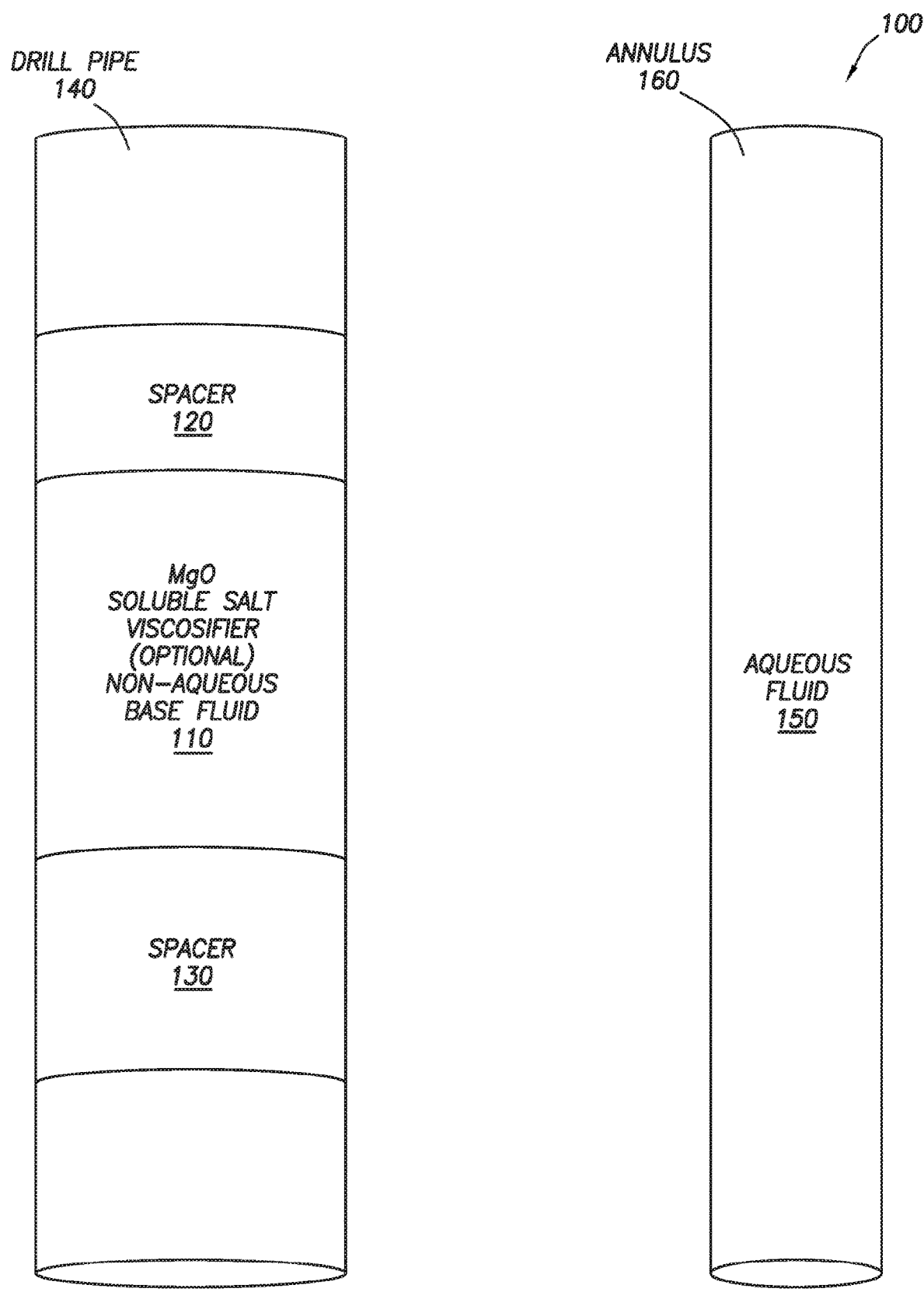
FIG. 1 is a diagram of a dual flow path pumping technique for pumping components of a Sorel cement into a wellbore system in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "loss zone" refers to a portion of a subterranean formation into which fluids circulating in a wellbore may be lost. In certain embodiments, loss zones may include voids, vugular zones, wash-outs, lost circulation zones, perforations, natural fractures, induced fractures, and any combination thereof.

As used herein, the term "set" refers to the process of becoming hard or solid by curing. As used herein, references to particle sizes of a particular mesh "or larger" and grammatical equivalents thereof refers to particles of that particular mesh size and particles larger than that size. Similarly, as used herein, references to sizes of a particular mesh "or smaller" and grammatical equivalents thereof refers to particles of that particular mesh size and particles smaller than that size.

As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The present disclosure relates to cement compositions and methods for using the same in subterranean formations. More specifically, the present disclosure provides methods including: introducing a first treatment fluid including a first base fluid and a metal oxide into a wellbore penetrating at least a portion of a subterranean formation; introducing a spacer fluid into the wellbore that separates the first treatment fluid from at least a second treatment fluid (e.g., the second fluid); introducing the second treatment fluid into the wellbore, wherein the second treatment fluid includes a second base fluid and a soluble salt; allowing the first treatment fluid to contact the second treatment fluid to form a cement mixture; and allowing the cement mixture to at least partially set. In some embodiments, the present disclosure provides methods including: introducing a treatment fluid including a non-aqueous base fluid, magnesium oxide, a sulfate salt, and a viscosifier into a wellbore penetrating at least a portion of a subterranean formation having a loss zone; allowing the treatment fluid to contact an aqueous fluid in the wellbore or the subterranean formation; and allowing the treatment fluid to at least partially set, wherein the treatment fluid at least partially plugs the loss zone.

In some embodiments, the present disclosure provides methods including: generating a mixing model for a well system including a wellbore penetrating at least a portion of a subterranean formation, a first treatment fluid including a first base fluid and magnesium oxide, at least one spacer fluid, and a second treatment fluid including a second base fluid and a soluble salt; using the mixing model to determine one or more properties of at least one of the first treatment fluid, second treatment fluid, and the at least one spacer fluid; and performing a treatment operation for the well system based, at least in part, on the one or more properties, wherein the treatment operation includes: introducing the first treatment fluid into the wellbore; introducing the spacer fluid into the wellbore to separate the first treatment fluid from at least a second treatment fluid; introducing the second treatment fluid into the wellbore; allowing the first treatment fluid to contact the second treatment fluid to form a cement mixture; and allowing the cement mixture to at least partially set.

Among the numerous advantages of the present disclosure, the methods of the present disclosure may allow a cement composition that includes a metal oxide (e.g., a Sorel cement) to be pumped downhole as a single stream through a drill pipe, rather than pumping the reactive materials down the drill pipe and an aqueous fluid through the annulus. In certain embodiments, this may make pumping the composition simpler and easier. In some embodiments, the inclusion of a sulfate salt may improve the reactivity of the cement compositions and/or provide a lower-cost alternative to other salts. The methods and compositions of the present disclosure may be used as a lost circulation material that could be used on any formation, or in any drilling fluid. In certain embodiments, the treatment fluid is suitable for mitigating or preventing severe to total lost circulation, even when particulate solutions have failed. In certain embodiments, the treatment fluids of the present disclosure may be used in combination with other lost circulation materials, among other reasons, to improve their effectiveness.

Sorel cement may include a metal oxide and a soluble salt. In certain embodiments, the metal oxide may include, but is not limited to magnesium oxide, zinc oxide, and the like, and any combination thereof. In certain embodiments, the soluble salt may include, but is not limited to a chloride salt, a sulfate salt, a phosphate salt, and the like, and any combination thereof. In certain embodiments, the treatment fluids and/or the resulting cement mixture may have a weight ratio within a range of from about 2.5 to about 3.5 parts metal oxide to 1 part soluble salt, from about 2 to about 5 parts metal oxide to 1 part soluble salt, or from about 1 to about 10 parts metal oxide to 1 part soluble salt. Sorel cements may be used for any purpose, including but not limited to controlling water injection into zones that are not the targets of the injection prevention and lost circulation mitigation.

In certain embodiments, the metal oxide is magnesium oxide (MgO). The calcination of $Mg(OH)_2$ results in what is commonly referred to as "burned" MgO. Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination may cause the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C. the MgO is referred to as "dead-burned" since the majority of the reactivity has been eliminated. Dead-burned MgO has the highest degree of crystallinity of the three grades of burned MgO. A second type of MgO is produced by calcining at temperatures ranging from 1000° C.-1500° C. and is termed "hard-burned." Hard-burned MgO displays an intermediate crystallinity and reactivity when compared to the other two grades of burned MgO. Examples of hard-burned MgO include, without limitation, THERMATEK™ LT and THERMATEK™ HT additives, which are commercially available from Halliburton Energy Services. The third grade of MgO is produced by calcining at temperatures ranging from 700° C.-1000° C. and is termed "light-burned" or "caustic" magnesia. Light-burned MgO is characterized by a high surface area, a low crystallinity and a high degree of reactivity when compared to the other grades of burned MgO. In certain embodiments, the treatment fluids may include, but are no limited to hard-burned MgO, light-burned MgO, dead-burned MgO, or any combination thereof.

In some embodiments, certain properties of magnesium oxide may affect its reactivity (e.g., the extent and rate of hydration to $Mg(OH)_2$ when exposed to water, acids, or other reactive materials). For example, kiln temperature and residence time during manufacture may affect magnesium oxide reactivity. Consequently, magnesium oxide reactivity may vary. In some embodiments, magnesium oxide reactivity may be measured using an acetic acid or citric acid reactivity test. A reactivity test may include reacting a dilute (about 1N) acetic or citric acid solution with an excess of magnesium at a particular temperature and measuring how long it takes until the reaction is complete. In some embodiments, the end point of the reaction may be indicated by the pH of the solution changing from acidic to basic. In some embodiments, the magnesium oxide used in the treatment fluid may be sufficiently reactive such that an excess of magnesium oxide may fully react with acetic acid in under 40 seconds at around 28° C. In certain embodiments, the magnesium oxide is capable of reacting substantially completely with a 1N solution of aqueous acetic acid in less than 40 seconds at around 28° C. In certain embodiments, the magnesium oxide is capable of reacting substantially completely with a 1N solution of aqueous acetic acid in less than 15 seconds at around 28° C.

In one or more embodiments, the metal oxide includes particles sized within a range of from about 18 U.S. mesh (around 1000 microns) to about 500 U.S. mesh (around 25 microns). In some embodiments, the metal oxide includes particles sized 18 U.S. mesh (around 1000 microns) or smaller. In certain embodiments, the metal oxide includes particles sized 500 U.S. mesh (around 30 microns) or larger. In certain embodiments, at least 95% of the metal oxide particles may be sized 100 U.S. mesh (around 150 microns) or smaller. In certain embodiments, at least 50% of the metal oxide particles may be sized 170 U.S. mesh (around 88 microns) or smaller. In certain embodiments, at least 5% of the metal oxide particles may be sized 325 U.S. mesh (around 44 microns) or smaller. In certain embodiments, the metal oxide of the present disclosure may have particle sizes in a particular range or in several discrete ranges (e.g., a multimodal material). For example, in certain embodiments, the metal oxide may exhibit a particle size distribution between about 850 microns and about 5 microns. In other embodiments, the metal oxide may exhibit a particle size distribution between about 425 microns and about 25 microns. In some embodiments, the metal oxide may exhibit a particle size distribution between about 1000 microns and about 25 microns.

In one or more embodiments, the metal oxide may be present in a treatment fluid in an amount within a range of from about 0.1% to about 30% by weight of the treatment fluid (e.g., about 1%, about 5%, about 10%, about 15%, about 20%, about 25%, about 30%, etc., all by weight of the treatment fluid). In other embodiments, the metal oxide may be present in a treatment fluid in an amount within a range of from about 1% to about 20% by weight of the treatment fluid. In one or more embodiments, the metal oxide may be present in the treatment fluid in an amount within a range of from about 10% to about 20% by weight of the treatment fluid. In some embodiments, the metal oxide may be present in a concentration of about 15% to about 20% by weight of the treatment fluid.

In certain embodiments, a spacer fluid is used to separate treatment fluids that include portions of the reactive materials of Sorel cement. In some embodiments, the treatment fluids are all introduced into a subterranean formation via the same flow path (e.g., drill pipe, annulus, etc.). For example, in certain embodiments, the first treatment fluid is introduced first and includes magnesium oxide, and the second treatment fluid is introduced thereafter and includes a soluble salt and a viscosifier. In some embodiments, the first treatment fluid is introduced first and includes a magnesium oxide and a viscosifier, and the second treatment fluid is introduced thereafter and includes a soluble salt. A person of skill in the art with the benefit of this disclosure will appreciate that the components of the treatment fluids could be arranged in different ways, and the treatment fluids could be introduced in a different order. In some embodiments, one or more additional spacer fluids may be introduced into the wellbore in different intervals before, in between, or after the treatment fluids. For example, in certain embodiments, a spacer fluid may be introduced before the first treatment fluid to separate the first treatment fluid from other fluids in the wellbore (e.g., a drilling fluid). In some embodiments, a spacer fluid may be introduced after the second treatment fluid to separate the second treatment fluid from other fluids in the wellbore (e.g., a drilling fluid).

The spacer fluids of the present disclosure may include aqueous and/or non-aqueous fluids. A person of ordinary skill in the art with the benefit of this disclosure would understand how to determine the appropriate spacer fluids for various embodiments of present disclosure. In some embodiments, a drilling fluid may be used as a spacer fluid.

In some embodiments, the spacer fluids between the treatment fluids may reduce or prevent the treatment fluids or components thereof from mixing with, reacting with, or contacting each other during introduction into the wellbore. In certain applications, components from treatment fluids separated by a spacer fluid may, to some degree, mix with a spacer fluid during pumping. In some embodiments, a mixing model may be generated to simulate a well system including a wellbore penetrating at least a portion of a subterranean formation, a first treatment fluid including a first base fluid and magnesium oxide, at least one spacer fluid, and a second treatment fluid including a second base fluid and a soluble salt. In some embodiments, the mixing model may simulate a treatment operation including treatment fluids and spacer fluids in order to reduce and/or eliminate mixing. In certain embodiments, the mixing model may be used to calculate the minimum volume of spacer fluid necessary to prevent mixing between the treatment fluids. For example, the volume of the spacer fluid may be increased in the mixing model until there is no mixing of the first and second treatment fluids.

In certain embodiments, the mixing model may simulate the interface mixing length between the fluids based, at least in part, on at least one of the Reynolds numbers for each fluid and whether each fluid exhibits turbulent or laminar flow. A Reynolds number (Re) is a dimensionless value that may be described as follows:

$$Re = \frac{\rho v D}{\mu} \qquad (1)$$

where ρ is density, v is fluid velocity, D is pipe diameter, and µ is viscosity.

In some embodiments, fluid Reynolds numbers are an input to the mixing model. For example, in certain embodiments, a calculated Reynolds number is compared to a critical Reynolds number to determine whether turbulent or laminar flow is expected. A mixing model may be selected based, at least in part, on whether turbulent or laminar flow is expected for a certain application. In some embodiments, the constraints of the mixing model may include, but are not limited to wellbore pressure, pump pressure limits, pipe diameter, pipe length, temperature, pressure, and the like, and any combination thereof. In certain embodiments, the mixing model may be used to determine at least one or properties of one or more treatment fluids or spacer fluids based, at least in part, on minimizing the mixing between the fluids. In certain embodiments, one or more properties may include, but are not limited at least one of a pump rate, a viscosity, a volume, a rheology, a density, or a composition of one or more treatment fluids or spacer fluids. The mixing model may be used to determine the one or more properties, for example, by simulating the fluid and interface behavior of the first treatment fluid, second treatment fluid, and spacer fluids. In one or more embodiments, the mixing model may be used to determine a temperature or pressure at which fluids are pumped. In some embodiments, the mixing model may be used to determine one or more fluid properties based, at least in part, on the Reynolds numbers for the fluids. In certain embodiments, the mixing model may be used to calculate one or more properties of the fluids that result in turbulent flow and/or the least amount of mixing. In certain embodiments, a treatment operation may be performed based, at least in part, on the one or more properties determined using the mixing model.

In some embodiments, an information handling system may be used generate, run, or otherwise operate on the mixing model and/or perform any calculations associated with the mixing model. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In an embodiment, one or more treatment fluids may include a soluble salt. Soluble salts suitable for certain embodiments of the present disclosure include, but are not limited to a chloride salt, a phosphate salt, a sulfate salt, or any combination thereof. In some embodiments, the treatment fluid includes an alkaline earth metal chloride such as magnesium chloride ($MgCl_2$) or magnesium chloride hexahydrate, $MgCl_2.6H_2O$. In certain embodiments, for example, the sulfate salt may include $MgSO_4$. In certain embodiments, the sulfate salt may include, but is not limited to $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and the like, and any combination thereof. In certain embodiments, after setting, a cement mixture including a sulfate salt may exhibit a compressive strength 70% higher than an identical cement mixture including a chloride salt instead of the sulfate salt. In some embodiments, after setting, a cement mixture including a sulfate salt may sustain differential pressures 200%, 300%, 400%, 500%, 600%, 700%, 800%, 900%, 1000% greater than the an identical cement mixture having a chloride salt instead of the sulfate salt.

In one or more embodiments, a soluble salt may be present in a treatment fluid in an amount within a range of from about 0.1% to about 20% by weight of the treatment fluid (e.g., about 1%, about 5%, about 10%, about 15%, about 20%, etc.). In other embodiments, the soluble salt may be present in a treatment fluid in an amount within a range of from about 1% to about 15% by weight of the treatment fluid. In some embodiments, the soluble salt may be present in the treatment fluid in an amount within a range of from about 5% to about 15% by weight of the treatment fluid.

In one or more embodiments, the soluble salt may include particles sized within a range of from about 5 U.S. mesh (about 4000 microns) to about 100 U.S. mesh (around 150 microns). In some embodiments, the soluble salt includes particles sized 5 U.S. mesh (about 4000 microns) or smaller. In certain embodiments, the soluble salt includes particles sized 100 U.S. mesh (about 150 microns) or larger. In other embodiments, the soluble salt includes particles sized 500 U.S. mesh (around 25 microns) or larger. In certain embodiments, at least 95% of the soluble salt particles may be sized 16 U.S. mesh (about 1190 microns) or smaller. In certain embodiments, at least 50% of the soluble salt particles may be sized 30 U.S. mesh (about 595 microns) or smaller. In certain embodiments, at least 5% of the soluble salt particles may be sized 50 U.S. mesh (about 300 microns) or smaller. In certain embodiments, the soluble salt of the present disclosure may have particle sizes in a particular range or in several discrete ranges (e.g., a multimodal material). For example, in certain embodiments, the soluble salt may exhibit a particle size distribution between about 850 microns and about 5 microns. In other embodiments, the soluble salt may exhibit a particle size distribution between about 425 microns and about 25 microns. In other embodiments, the soluble salt may exhibit a particle size distribution between about 4000 microns and about 150 microns. In certain embodiments, the soluble salt may be at least 95% soluble in water.

In certain embodiments, a treatment fluid may include a viscosifier. Examples of viscosifiers suitable for certain embodiments of the present disclosure include, but are not limited to clays, high molecular weight biopolymers, polysaccharides, celluloses, fibers, and the like, and any combination thereof. Examples of clays suitable for certain embodiments of the present disclosure include, but are not limited to bentonite, sodium montmorillonite clay, attapulgite clay, and the like, and any combination thereof. An example of a sodium montmorillonite clay is AQUAGEL®, commercially available from Halliburton Energy Services, Inc., of Houston, Tex. An example of an attapulgite clay is ZEOGEL®, also commercially available from Halliburton Energy Services, Inc., of Houston, Tex. Fibers suitable for certain embodiments of the present disclosure include, but are not limited to acid-soluble mineral fibers, such as the fiber commercially available from Halliburton Energy Services, Inc., of Houston, Tex. under the trade name N-SEAL. In some embodiments, the viscosifier includes tau mod. In some embodiments, a treatment fluid may include a petroleum hydrocarbon resin of different particle sizes, including, but not limited to BARARESIN® commercially available from Halliburton Energy Services, Inc., of Houston, Tex.

In one or more embodiments, a viscosifier may be present in a treatment fluid in an amount within a range of from about 1% to about 60% by weight of the treatment fluid (e.g., about 5%, about 10%, about 15%, about 20%, about 25%, about 30%, about 35%, about 40%, about 45%, about 50%, or about 55%, all by weight of the treatment fluid). In one or more embodiments, the viscosifier may be present in a treatment fluid in an amount within a range of from about 1% to about 35% by weight of the treatment fluid. In other embodiments, the viscosifier may be present in the treatment fluid in an amount within a range of from about 1% to about 10% by weight of the treatment fluid. In some embodiments, the viscosifier may be present in a concentration of about 1%, about 1.7%, about 5%, about 10%, about 13%, or about 15% by weight of the treatment fluid. Alternatively, the amount of viscosifier may be expressed by weight of dry solids. For example, the viscosifier may be present in an amount within a range of from about 1% to about 99% by weight of dry solids (e.g., about 1%, about 5%, about 10%, about 20%, about 30%, about 40%, about 50%, about 60%, about 70%, about 80%, about 90%, or about 99%, all by weight of dry solids). In some embodiments, the viscosifier may be present in an amount within a range of from about 1% to about 20% and, alternatively, from about 1% to about 10% by weight of dry solids. In some embodiments, the treatment fluid includes a viscosifier in an amount equal to or less than the amount of viscosifier needed to create a fluid that reaches a consistency of 40 Bearden units in 15 minutes after the cementing reaction begins.

In some embodiments, a "gunking reaction" may occur for one or more treatment fluids, allowing some movement for placement before the Sorel cement reaction and setting occurs. In some embodiments, the gunk that forms from a gunking reaction includes a viscous semi-solid mass that, when formed downhole in the flow path of a fluid, may offer immediate and significant resistance to penetration by the fluid and thereby prevent its flow. In some embodiments, the viscosity of the treatment fluid after the gunking reaction may be within a range of from about 1,000,000 centipoise to about 20,000,000 centipoise. In some embodiments, the gunking reaction may be created by the presence of a viscosifier. In certain embodiments, an attapulgite clay may cause a gunking reaction.

In one or more embodiments, treatment fluids may mix with each other or with other fluids in a wellbore or subterranean formation to form a cement mixture that at least partially sets. In some embodiments, the cement mixture may develop a compressive strength within a range of from about 50 psi to about 20,000 psi. In other embodiments, the cement mixture may develop a compressive strength within a range of from about 100 psi to about 10,000 psi. In yet other embodiments, the cement mixture may develop a compressive strength within a range of from about 1,000 psi to about 10,000 psi. In one or more embodiments, the compressive strength of the cement mixture may develop within a range of from about 15 minutes to about 24 hours after the reactive materials mix and the cementing reaction begins. In other embodiments, the compressive strength of the cement mixture may develop within a range of from about 20 minutes to about 10 hours after the reactive materials mix and the cementing reaction begins. In yet other embodiments, the compressive strength of the cement mixture may develop within a range of from about 30 minutes to about 8 hours after the reactive materials mix and the cementing reaction begins. As will be understood by one of ordinary skill in the art, the compressive strength that develops may be directly proportional to the ratio of Sorel cement to oleaginous fluid. Consequently, increasing the amount of Sorel cement present in the treatment fluid may result in an increased final compressive strength of the set composition.

In certain embodiments, the treatment fluids of this disclosure exhibit a relatively constant viscosity for a period of time after they are initially prepared and while they are being introduced into the wellbore, e.g., during the period when the treatment fluids are in motion. In certain embodiments, once mixed with the reactive materials, the cement mixture quickly sets and the viscosity increases from about 35 Bearden consistency units (Bc) to about 70 Bc or higher in about 60 minutes or less, about 50 minutes or less, about 40 minutes or less, about 30 minutes or less, about 20 minutes or less, about 10 minutes or less, or about 1 minute or less. In certain embodiments, such a sudden increase in viscosity may be desirable to prevent gas or water migration into the cement mixture, which may facilitate the quick formation of an impermeable mass from a gelled state after placement. This behavior may be referred to as "Right Angle Set" and such cement compositions may be called "Right Angle Set Cement Compositions" in reference to the near right angle increase shown in a plot of viscosity as a function of time.

In one or more embodiments, a treatment fluid (e.g., before the cement mixture is formed and/or set) may have a density within a range of from about 4 lbs/gallon (ppg) to about 25 ppg. In other embodiments, a treatment fluid may have a density within a range of from about 12 ppg to about 17 ppg. In yet other embodiments, a treatment fluid may have a density within a range of from about 6 ppg to about 14 ppg. Density reducing additives such as glass beads or foam and expanding additives such as gas, suspension aids, defoamers and the like may be included in a treatment fluid to generate a lightweight cement slurry. A person of skill in the art with the benefit of this disclosure would understand how to determine suitable amounts of such density-reducing additives and methods for their use.

The treatment fluids used in the methods of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc.

Aqueous base fluids that may be suitable for use in the methods and systems of the present disclosure may include water from any source. Such aqueous fluids may include fresh water, field water, salt water (e.g., water containing one or more salts dissolved therein), brine (e.g., saturated salt water), seawater, or any combination thereof. In most embodiments of the present disclosure, the aqueous fluids include one or more ionic species, such as those formed by salts dissolved in water. In some embodiments, the aqueous base fluid may include BRINE-DRIL-N® (a high density, polymeric, brine-based system, available from Halliburton Energy Services, Inc.) or HYDRO-GUARD®, both available from Halliburton Energy Services, Inc. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Water-based fluids suitable for certain embodiments of the present disclosure may include, but are not limited to, field water, sea water, brines, Examples of non-aqueous base fluids suitable for certain embodiments of the present disclosure include, but are not limited to natural oil based muds (OBM), synthetic based muds (SBM), natural base oils, synthetic base oils and invert emulsions. In certain embodiments, the non-aqueous base fluid may include safra oil. In certain embodiments, the non-aqueous base fluid may include any petroleum oil, natural oil, synthetically derived oil, or combinations thereof. In some embodiments, OBMs and SBMs may include some non-oleaginous fluid such as water, making them water-in-oil type emulsions, also known as invert emulsions wherein a non-oleaginous fluid (e.g. water) includes the internal phase and an oleaginous fluid includes the external phase. The non-oleaginous fluid (e.g. water) may arise in the treatment fluid itself or from the wellbore, or it may be intentionally added to affect the properties of the treatment fluid. Any known non-aqueous fluid may be used to form the external oil phase of the invert emulsion fluid. In certain embodiments, the non-aqueous base fluid does not include a significant amount of water.

In some embodiments, a non-aqueous base fluid of a treatment fluid may prevent one or more components of the treatment fluid from reacting until it is mixed with water or a water precursor. In some embodiments, the treatment fluids of the present disclosure may contact a separate aqueous fluid already present in the wellbore (e.g., a water-based drilling fluid). In certain embodiments, the aqueous fluid may act as the water or a water precursor for the reactive materials in a treatment fluid. In certain embodiments, upon coming into contact with an aqueous fluid, the treatment fluids may create a cement mixture at least partially set (e.g., thicken). In some embodiments, upon contacting the treatment fluid with an aqueous fluid, the compressive strength of the treatment fluid may increase. In certain embodiments, allowing the treatment fluid to contact an aqueous fluid may result in the formation of Sorel cement. In some embodiments, the reactive materials of a Sorel cement may be contained or distributed in a non-aqueous fluid that prevents reaction until it is mixed with water or a water precursor. In such an embodiment, the reactive materials may be pumped down one path (e.g., a drill pipe), while the water or water precursor may be pumped down another path (e.g., the annular space between the drill pipe and the drill hole wall).

In certain embodiments, the reactive materials (e.g., a metal oxide and/or soluble salt) and aqueous fluid are pumped in a particular ratio. In certain embodiments, for example, the ratio of reactive material to aqueous fluid may be in a range of from about 20:80 to about 30:70 by weight, from about 10:90 to about 40:60 by weight, or from about 5:95 to about 50:50 by weight. In other embodiments, the reactive material may be introduced into the wellbore in at least an amount sufficient to provide a ratio of reactive material to aqueous fluid greater than about 20:80 by weight. In some embodiments, the ratio may depend on the temperature of the wellbore. In certain embodiments, for example, a greater amount of the reactive materials may be required at higher temperature.

In some embodiments, the treatment fluids of the present disclosure may include a weighting agent. Examples of suitable weighting agents include, but are not limited to barite, hematite, calcium carbonate, magnesium carbonate, iron carbonate, zinc carbonate, manganese tetraoxide, ilmenite, NaCl, KCl, $CaCl_2$, formate salts, and the like, and any combination thereof. These weighting agents may be at least partially soluble or insoluble in the treatment fluid. In one or more embodiments, a weighting agent may be present in the treatment fluids in an amount within a range of from about 1% to about 60% by weight of the treatment fluid (e.g., about 5%, about 10%, about 15%, about 20%, about 25%, about 30%, about 35%, about 40%, about 45%, about 50%, about 55%, etc., all by weight of the treatment fluid). In other embodiments, the weighting agents may be present in the treatment fluids in an amount within a range of from about 1% to about 35% by weight of the treatment fluid. In some embodiments, the weighting agent may be present in the treatment fluids in an amount within a range of from about 1% to about 10% by weight of the treatment fluid. Alternatively, the amount of weighting agent may be expressed by weight of dry solids. For example, the weighting agent may be present in an amount within a range of from about 1% to about 99% by weight of dry solids (e.g., about 1%, about 5%, about 10%, about 20%, about 30%, about 40%, about 50%, about 60%, about 70%, about 80%, about 90%, about 99%, etc., all by weight of dry solids). In some embodiments, the weighting agent may be present in an amount within a range of from about 1% to about 20% and, alternatively, within a range of from about 1% to about 10% by weight of dry solids.

Certain components of the treatment fluid may be provided as a "dry mix" to be combined with the base fluid and/or other components prior to or during introducing the treatment fluid into the subterranean formation. In some embodiments, the additives to the treatment fluid (e.g., a viscosifier, salt, and other additives) fluid may be stored together in sealed totes or containers prior to use. In some embodiments, a metal oxide may be added to the treatment fluid on the fly as a dry additive. In certain embodiments, a reactive material formulation including the metal oxide and soluble salt may be a dry mix added to a base fluid. In certain embodiments, a reactive material formulation may be suitable for base fluids in the amount of 9.5 ppg. In other embodiments, a reactive material formulation may be suitable for base fluids in the amount of 10 ppg.

Embodiments of the treatment fluids of the present disclosure may be prepared in accordance with any suitable technique. In some embodiments, the desired quantity of base fluid may be introduced into a mixer (e.g., a cement blender) followed by the dry mix. The dry blend may include the soluble salt, metal oxide and additional solid additives, for example. Additional liquid additives, if any, may be added to the base fluid as desired prior to, or after, combination with the dry blend. This mixture may be agitated for a sufficient period of time to form a slurry. It will be appreciated by those of ordinary skill in the art, with the benefit of this disclosure, other suitable techniques for preparing treatment fluids may be used in accordance with embodiments of the present invention.

In some embodiments, the treatment fluids of the present disclosure may include a fluid loss control additive. Examples of suitable fluid loss control additives include FILTER-CHEK™ fluid (i.e., carboxymethyl starch), N-DRIL™ HT PLUS fluid (i.e., a crosslinked corn starch), PAC™-L fluid (i.e., polyanionic cellulose), all of which are commercially available from Halliburton Energy Services, Inc., and combinations thereof.

In certain embodiments, the treatment fluids may include lime. In certain embodiments, the lime may be hydrated lime. In some embodiments, the lime may be present in an amount within a range of from about 0.01% to about 5% by weight of (bwo) a weighting agent in the fluid, from about 1% to about 10% bwo a weighting agent in the fluid, or from about 1 to about 3% bwo a weighting agent in the fluid. In certain embodiments, the lime may be present in an amount within a range of at least 0.7% bwo the weighting agent in the treatment fluid.

In certain embodiments, the treatment fluid does not include a bridging agent. In some embodiments, the treatment fluid is free or substantially free of particulates other than the soluble salt and the metal oxide. In certain embodiments, the treatment fluids of the present disclosure may include lost circulation materials or bridging agents. In some embodiments, lost circulation materials may be included in the compositions as a secondary mechanism to cure the losses without altering the thixotropic behavior of the treatment fluid. In certain embodiments, lost circulation materials may include, but are not limited to, BARACARB® particulates (ground marble, available from Halliburton Energy Services, Inc.) including BARACARB® 5, BARACARB® 25, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); and the like; and any combination thereof. In certain embodiments, the treatment fluid does not include a lost circulation material.

In some embodiments, the methods of the present disclose may include introducing at least a portion of the treatment fluids into a loss zone or other flowpath and causing or allowing the treatment fluid to at least partially set (e.g., gel, gunk, etc.). In some embodiments, the treatment fluids may be introduced into the wellbore to prevent the loss of aqueous or non-aqueous fluids into loss zones such as voids, vugular zones, perforations, and natural or induced fractures. In certain embodiments, the treatment fluids may form a non-flowing, intact mass inside the loss-circulation zone which plugs the zone and inhibits loss of subsequently pumped drilling fluid, which allows for further drilling. For example, in certain embodiments, the treatment fluid may function as a plug that is placed into an annulus of the wellbore and prepares the formation for placement of a second (e.g., cementitious) composition. In certain embodiments, the treatment fluid may be introduced into the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof. In some embodiments, one or more treatment fluids may at least partially plug a loss zone. In certain embodiments, a cement mixture of the present disclosure may set and at least partially plug a loss zone.

In certain embodiments, the treatment fluids of the present disclosure may be suitable for use at a variety of temperatures, pH levels, water salinities, and mineralogies of subterranean formations. In some embodiments, the materials that make up the treatment fluids may at least partially set and/or be stable at high temperatures. In certain embodiments, the materials that make up the treatment fluids function at temperatures above 90° F. and above 260° F. In certain embodiments, the methods of present disclosure allow make the faster reaction rate caused by higher temperatures acceptable because the reaction does not begin until the components meet in the wellbore. Thus, in certain embodiments, the treatment fluids and methods of the present disclosure may provide effective loss zone treatment, plug formation, and other wellbore treatment, even when used in conditions at or above 260° F. In certain embodiments, the treatment fluids including the reactive materials may contact at a temperature of at least 260° F. In some embodiments, the treatment fluids including the Sorel cement reactive materials may contact at a temperature of at least 90° F. Moreover, the properties of treatment fluids may be effective over a range of pH levels. For example, in certain embodiments, the treatment fluids may provide effective fluid displacement and loss zone treatment from a pH within a range of about 7 to about 12. Additionally, the treatment fluids of the present disclosure may be suitable for a variety of subterranean formations, including, but not limited to shale formations and carbonate formations.

In certain embodiments, the treatment fluids of the present disclosure optionally may include any number of additional additives. Examples of such additional additives include, but are not limited to, additional salts, surfactants, acids, proppant particulates, diverting agents, gas, nitrogen, carbon dioxide, surface modifying agents, tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), cross-linking agents, curing agents, gel time moderating agents, curing activators, and the like. In some embodiments, the treatment fluid may contain rheology (viscosity and gel strength) modifiers and stabilizers. A person skilled in the art, with the benefit of this disclosure, will recognize the types of additives that may be included in the fluids of the present disclosure for a particular application.

The methods and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments.

The treatment fluids disclosed herein may directly or indirectly affect one or more components or pieces of equipment associated with the preparation, delivery, recapture, recycling, reuse, and/or disposal of the disclosed treatment fluids. For example, the disclosed treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary treatment fluids. The disclosed treatment fluids may also directly or indirectly affect any transport or delivery equipment used to convey the treatment fluids to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of treatment fluids, and any sensors (i.e., pressure and temperature), gauges, and/or combinations thereof, and the like. The disclosed treatment fluids may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), wiper balls, wiper darts, pigs, logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 2:
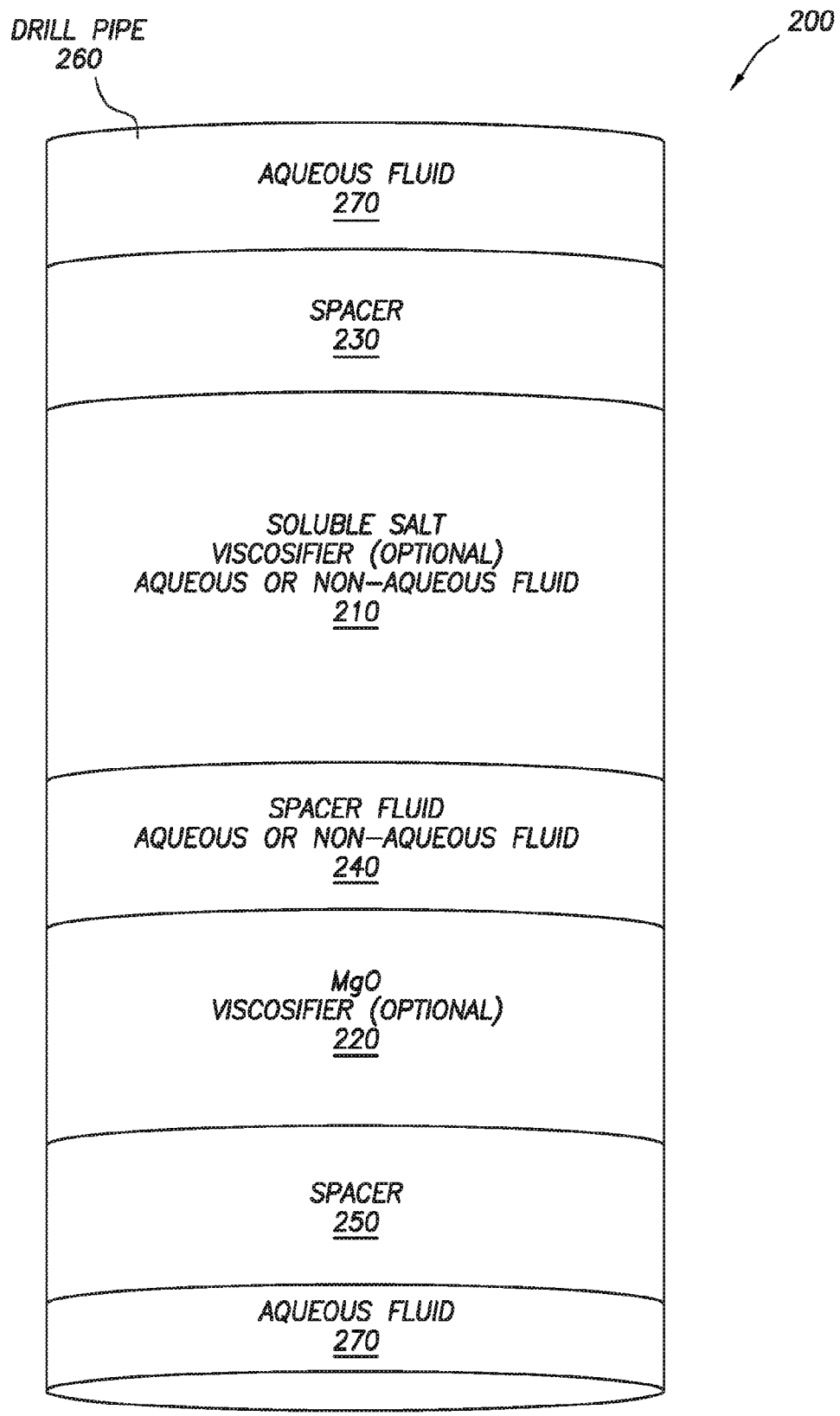
FIG. 2 is a diagram of a single flow path pumping technique for pumping components of a Sorel cement into a wellbore system in accordance with certain embodiments of the present disclosure.
Figure 3:
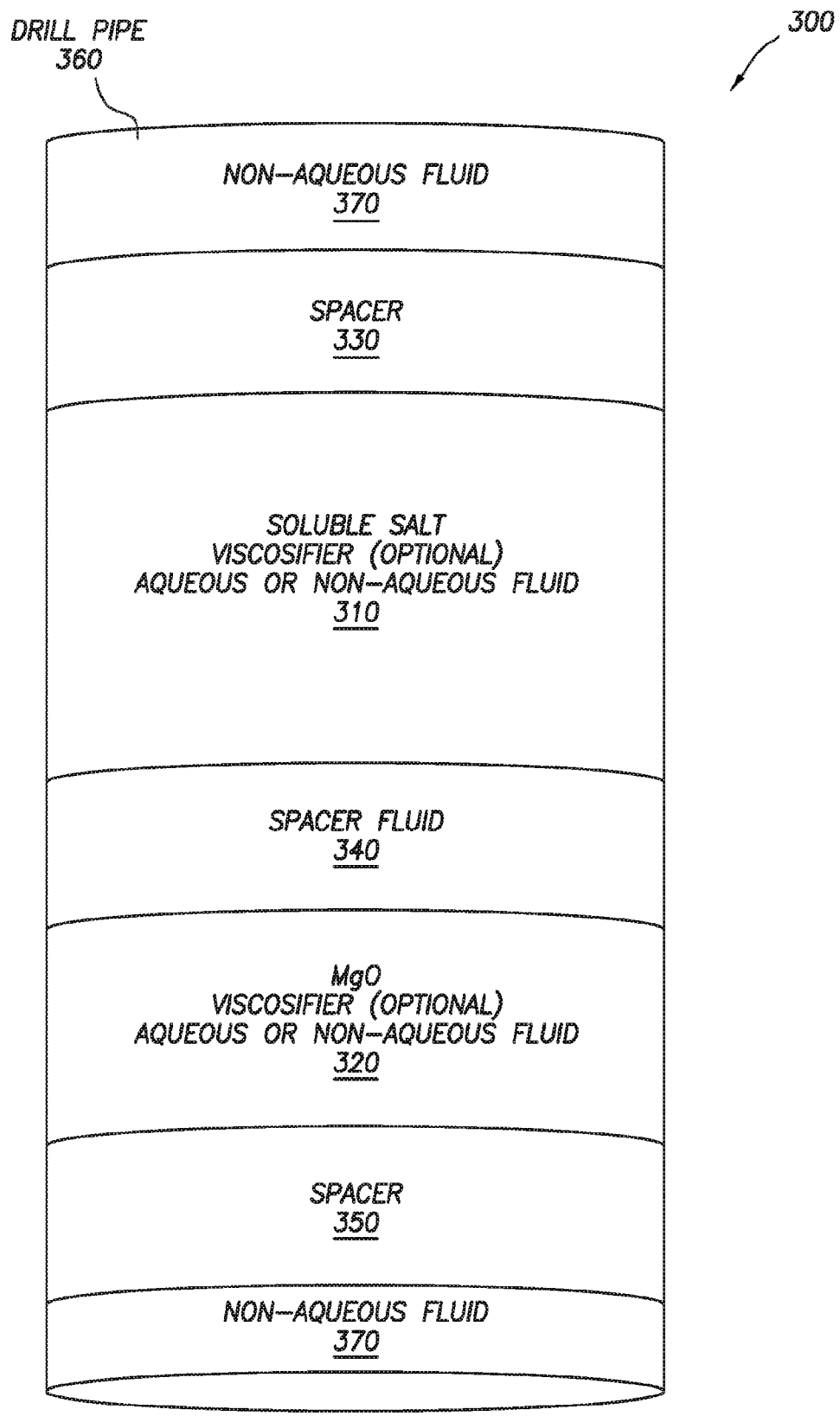
FIG. 3 is a diagram of a single flow path pumping technique for pumping Sorel cement into a wellbore system in accordance with certain embodiments of the present disclosure.

FIG. 1 is a diagram of a pumping technique 100 for pumping components of a Sorel cement into a wellbore system including a water-based fluid. In this technique, a single non-aqueous pill 110 contains all the reactive materials and has spacer fluids 120, 130 on either side to constrain it from spreading along the drill string. It is pumped down the drill pipe 140 while an aqueous fluid such as a water-based mud 150 is simultaneously pumped down the annulus 160 at a specified ratio. In some embodiments, the cementing reaction will not occur until the non-aqueous pill 110 contacts the aqueous fluid 150 in the wellbore. As depicted in FIGS. 1, 2, and 3, the pills or spacer fluids depicted at the bottom of the diagram would be introduced into the flow path first, followed by the pills or spacer fluids above them.

FIG. 2 is a diagram of a pumping technique 200 for pumping components of a Sorel cement into a wellbore system including a water-based fluid 270 in accordance with certain embodiments of the present disclosure. The reactive materials are pumped down the drill pipe 260 in two pills 210, 220 with spacers 230, 240, 250 to constrain them from spreading along the drill string and mixing with each other and with the aqueous fluid 270 in the drill pipe 260. As depicted, the reactive materials are split between the pills 210, 220 such that the magnesium oxide is in the lower pill 220 and the soluble salt (e.g., $MgCl_2.6H_2O$) and an optional viscosifier (e.g., attapulgite clay) are in the upper pill 210. Once the reactive materials in the pills 210, 220 reach the end of the drill pipe, they will mix and the cementing reaction will occur. In embodiments including a viscosifier, a gunking reaction may occur as well. Although FIG. 2 depicts the pill including magnesium oxide 220 being pumped first, a person of ordinary skill in the art will appreciate that the pills 210, 220 could be pumped in a different order.

In addition, the methods of the present disclosure may allow the Sorel cement composition to be used for a well system including a non-aqueous fluid (e.g., an oil-based mud). FIG. 3 is a diagram of a pumping technique 300 for pumping Sorel cement into a wellbore system including a non-aqueous fluid 370 in accordance with certain embodiments of the present disclosure. The reactive materials are pumped down the drill pipe 360 in two pills 310, 320 with spacers 330, 340, 350 to constrain them from spreading along the drill string and mixing with each other and with the non-aqueous fluid 370 in the drill pipe 360. As depicted, the reactive materials are split between the pills 310, 320 such that the magnesium oxide is in the lower pill 220 and the soluble salt (e.g., $MgCl_2.6H_2O$) and an optional viscosifier (e.g., attapulgite clay) are in the upper pill 310. Once the reactive materials in the pills 310, 320 reach the end of the drill pipe, they will mix and the cementing reaction will occur. In embodiments including a viscosifier, a gunking reaction may occur as well. Although FIG. 3 depicts the pill including magnesium oxide 320 being pumped first, a person of ordinary skill in the art will appreciate that the pills 310, 320 could be pumped in a different order. As shown in FIG. 3, the reactive materials may be introduced into the wellbore in aqueous or non-aqueous base fluids separated by spacer fluids, so that when the reactive components mix in the wellbore, the Sorel cement reaction will occur. At least one of the base fluids for the pills 310, 320 may be an aqueous fluid so that there is water to cause the cementing reaction. If the reactive components were pumped downhole in a non-aqueous fluid for a well system using only an oil-based mud and no aqueous fluid, the treatment fluid may not set. Although FIGS. 1, 2, and 3 depict flow through a drill pipe, a person of ordinary skill in the art would recognize that the fluids could be introduced via another flow path (e.g., an annulus).

Figure 4:
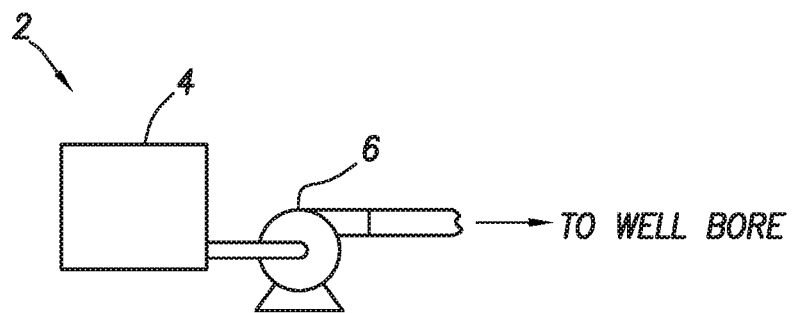
FIG. 4 illustrates a system for preparation and delivery of a cement composition to a wellbore in accordance with aspects of the present disclosure.

Referring now to FIG. 4, a system that may be used in the preparation of a treatment fluid in accordance with example embodiments will now be described. FIG. 4 illustrates a system 2 for preparation of a treatment fluid and delivery to a wellbore in accordance with certain embodiments. As shown, the treatment fluid may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the wellbore.

Figure 5:
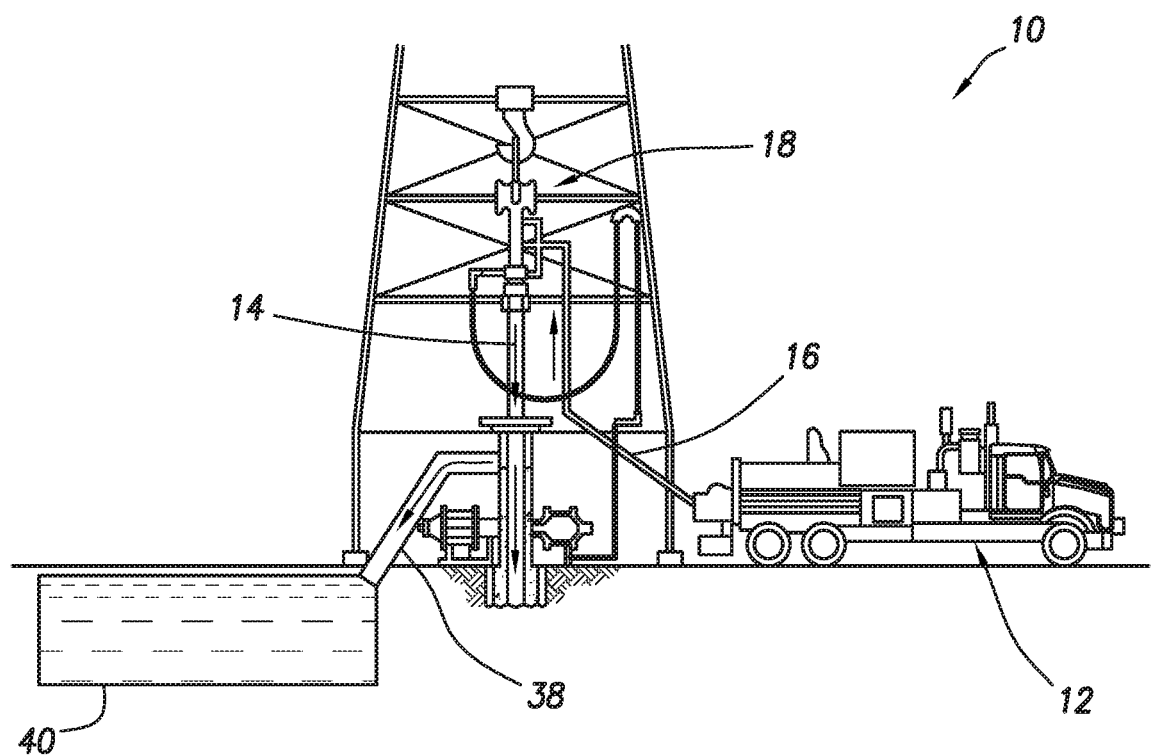
FIG. 5 illustrates surface equipment that may be used in placement of a cement composition in a wellbore in accordance with aspects of the present disclosure.

An example technique and system for placing a cement composition (e.g., a treatment fluid of the present disclosure) into a subterranean formation will now be described with reference to FIG. 5. FIG. 5 illustrates surface equipment 10 that may be used in placement of a cement composition in accordance with certain embodiments. It should be noted that while FIG. 5 generally depicts a land-based operation, those skilled in the art will readily recognize that the principles described herein are equally applicable to subsea operations that employ floating or sea-based platforms and rigs, without departing from the scope of the disclosure. As illustrated by FIG. 5, the surface equipment 10 may include a cementing unit 12, which may include one or more cement trucks. The cementing unit 12 may include mixing equipment 4 and pumping equipment 6 (e.g., FIG. 4) as will be apparent to those of ordinary skill in the art. The cementing unit 12 may pump a cement composition 14 through a feed pipe 16 and to a cementing head 18 which conveys the cement composition 14 downhole.

An embodiment of the present disclosure is a method comprising introducing a first treatment fluid comprising a first base fluid and a metal oxide into a wellbore penetrating at least a portion of a subterranean formation; introducing a spacer fluid into the wellbore that separates the first treatment fluid from at least a second treatment fluid; introducing the second treatment fluid into the wellbore, wherein the second treatment fluid comprises a second base fluid and a soluble salt; allowing the first treatment fluid to contact the second treatment fluid to form a cement mixture; and allowing the cement mixture to at least partially set.

In one or more embodiments described in the preceding paragraph, the set cement mixture at least partially plugs a loss zone in the subterranean formation. In one or more embodiments described above, at least one of the first treatment fluid and the second treatment fluid comprise a viscosifier. In one or more embodiments described above, the viscosifier is an attapulgite clay. In one or more embodiments described above, the first treatment fluid is introduced into the wellbore using one or more pumps. In one or more embodiments described above, one or more properties of the spacer fluid introduced into the wellbore are determined based, at least in part, on a mixing model that simulates the interface behavior of the first treatment fluid, second treatment fluid, and spacer fluid. In one or more embodiments described above, after allowing the first treatment fluid to contact the second treatment fluid, the cement mixture sets to a viscosity of about 70 Bc or higher in 60 minutes or less. In one or more embodiments described above, the soluble salt is a sulfate salt. In one or more embodiments described above, the sulfate salt is selected from the group consisting of: $MgSO_4$, $MgSO_4.2H_2O$, $MgSO_4.4H_2O$, $MgSO_4.5H_2O$, $MgSO_4.6H_2O$, $MgSO_4.7H_2O$, $MgSO_4.11H_2O$, and any combination thereof. In one or more embodiments described above, the metal oxide includes particles sized from about 50 U.S. mesh to about 500 U.S. mesh. In one or more embodiments described above, the metal oxide is magnesium oxide. In one or more embodiments described above, the magnesium oxide is capable of reacting substantially completely with a 1N solution of aqueous acetic acid in under 40 seconds at around 28° C. In one or more embodiments described above, the first and second treatment fluid are introduced into the same flow path in the wellbore. In one or more embodiments described above, the first base fluid is an aqueous fluid. In one or more embodiments described above, the soluble salt is present in the second treatment fluid in an amount within a range of from about 0.1% to about 20% by weight of the second treatment fluid. In one or more embodiments described above, the metal oxide is magnesium oxide, the soluble salt is $MgSO_4.7H_2O$, and at least one of the first treatment fluid and second treatment fluid comprise an attapulgite clay.

Another embodiments of the present disclosure is a method comprising introducing a treatment fluid comprising a non-aqueous base fluid, magnesium oxide, a sulfate salt, and a viscosifier into a wellbore penetrating at least a portion of a subterranean formation comprising a loss zone; allowing the treatment fluid to contact an aqueous fluid in the wellbore or the subterranean formation; and allowing the treatment fluid to at least partially set, wherein the treatment fluid at least partially plugs the loss zone. In one or more embodiments described in the preceding sentence, the viscosifier is an attapulgite clay.

Another embodiment of the present disclosure is a method comprising generating a mixing model for a well system comprising a wellbore penetrating at least a portion of a subterranean formation, a first treatment fluid comprising a first base fluid and magnesium oxide, at least one spacer fluid, and a second treatment fluid comprising a second base fluid and a soluble salt; using the mixing model to determine one or more properties of at least one of the first treatment fluid, second treatment fluid, and the at least one spacer fluid; and performing a treatment operation for the well system based, at least in part, on the one or more properties, wherein the treatment operation comprises: introducing the first treatment fluid into the wellbore; introducing the spacer fluid into the wellbore to separate the first treatment fluid from a second treatment fluid; introducing the second treatment fluid into the wellbore; allowing the first treatment fluid to contact the second treatment fluid to form a cement mixture; and allowing the cement mixture to at least partially set.

In one or more embodiments described in the preceding paragraph, using the mixing model to determine one or more properties comprises calculating the one or more properties that result in the least amount of mixing.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Table 1 lists compositions used to compare the properties of a hydrated treatment fluid including a chloride salt with a hydrated treatment fluid including a sulfate salt according to certain embodiments of the present disclosure. ZEO-GEL® is a viscosifier, BARARESIN® VIS is a petroleum hydrocarbon resin, and THERMATEK™ LT is hard-burned MgO, all commercially available from Halliburton Energy Services, Inc., of Houston, Tex. The treatment fluid including the sulfate salt was formed by directly substituting $MgSO_4.7H_2O$ for $MgCl_2.6H_2O$ on a mole-for-mole basis.

TABLE 1

Basic Formulation

| Hydrated Mg-Sulfate (9.5 ppg) | | Hydrated Mg-Chloride (9.5 ppg) | |
|---|---|---|---|
| Base oil, bbl | 0.79 | Base Oil, bbl | 0.79 |
| BARARESIN ® VIS (resin) g | 7 | BARARESIN ® VIS (resin), g | 7 |
| ZEOGEL ® (viscosifier), g | 52 | ZEOGEL ® (viscosifier), g | 52 |
| MgSO$_4$•7H$_2$O, g | 48 | MgCl$_2$•6H$_2$O, g | 40 |
| THERMATEK LT (MgO), g | 70 | THERMATEK LT (MgO), g | 70 |

A series of tests were performed on each treatment fluid in Table 1 and the results were compared as shown in Table 2 below. The tests included (A) a reaction time test measuring the rate of the reaction of the formulations with water (performed using a Fann Yield Stress Adapter (FYSA) Viscometer), (B) a compressive strength test performed using an Ultrasonic Cement Analyzer (UCA), (C) a differential plug breaking pressure test, (D) a pumpability test using a high temperature, high pressure (HTHP) consistometer, and (E) a four week storage test of each composition in a non-aqueous base fluid at 120° F., (F) a solubility test in 15% HCl. The pumpability test measured the time it took each composition to reach 70 Bearden consistency units (Bc), or become "unpumpable." The differential plug breaking pressure test was performed using a Permeability Plugging Apparatus (PPA) with either a 12 mm or a 31 mm trim. The results for the reaction time indicator test were the time it took each composition to reach a dial reading of greater than 300 on the FYSA viscometer after being mixed with an aqueous base fluid. Table 2 shows a comparison of the test results for the two compositions.

TABLE 2

| | Basic Formulation | | MgSO$_4$•7H$_2$O |
|---|---|---|---|
| Performed Test | MgCl$_2$•8H$_2$O | MgSO$_4$•7H$_2$O | Performance |
| (A) - RTI (Reaction Time Indicator), FYSA Viscometer | Exceeds Requirements | Exceeds Requirements | 20 seconds |
| (B) - Compressive strength, UCA, Ultra Sonic analyser | Does Not Meet Requirements | Exceeds Requirements | 70% higher than MgCl$_2$•8H$_2$O |
| (C) - Differential pressure, PBP (Plug Breaking Pressure) | Does Not Meet Requirements | Exceeds Requirements | 400% higher than MgCl$_2$•8H$_2$O |
| (D) - Pumpability, HPHT consistometer | Exceeds Requirements | Exceeds Requirements | 10 ± 2 minutes |
| (E) - Pill stability (Storage test @ 120° F.) | Does Not Meet Requirements | Exceeds Requirements | — |
| (F) - Solubility in 15% HCl | Exceeds Requirements | Exceeds Requirements | 80% solubility |

Table 3 lists four compositions that were tested to compare the pumpability of hydrated treatment fluids including sulfate and chloride salts. The 9.5 ppg formulations of Table 3 were the same as those described above in Table 1. The 10 ppg formulations of Table 3 were formed by adding a weighting agent to the 9.5 ppg formulations.

TABLE 3

| Density | | | Weighting | Initial Consistency, |
|---|---|---|---|---|
| lbs/gal (ppg) | lbs/ft$^3$ (pcf) | Formulations | Agent (%) | 190° F. |
| 9.5 | 71 | 9.5 ppg Sulfate Formulation | 0 | 15 |
| 9.5 | 71 | 9.5 ppg Chloride Formulation | 0 | 20 |
| 10 | 74.8 | 10 ppg Weighted Sulfate Formulation | <10 | 30 |
| 10 | 74.8 | 10 ppg Weighted Chloride Formulation | <10 | 40 |

Figure 6:
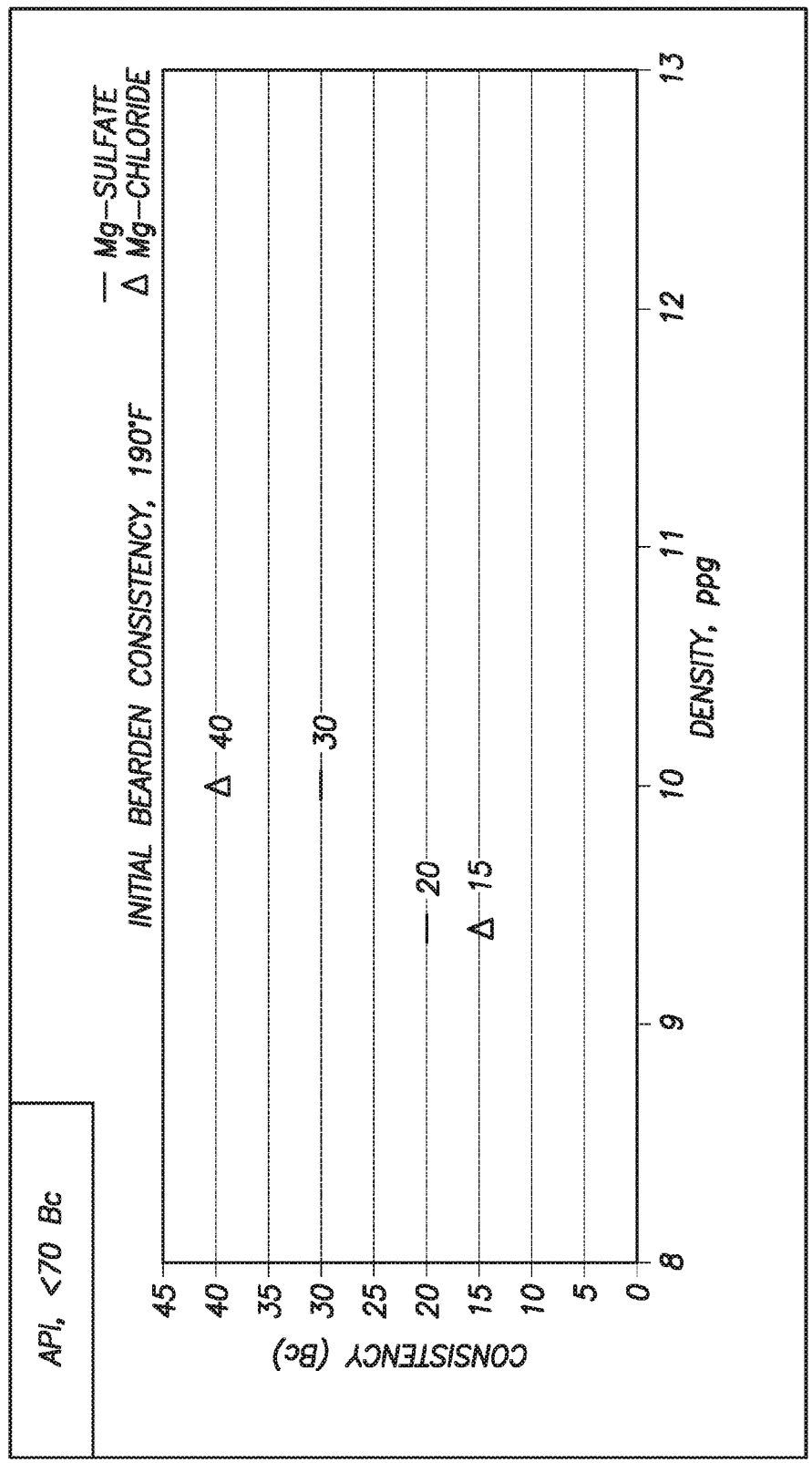
FIG. 6 is a plot illustrating initial Bearden consistency for hydrated treatment fluids of the present disclosure at 190° F. in accordance with certain embodiments of the present disclosure.
Figure 7:
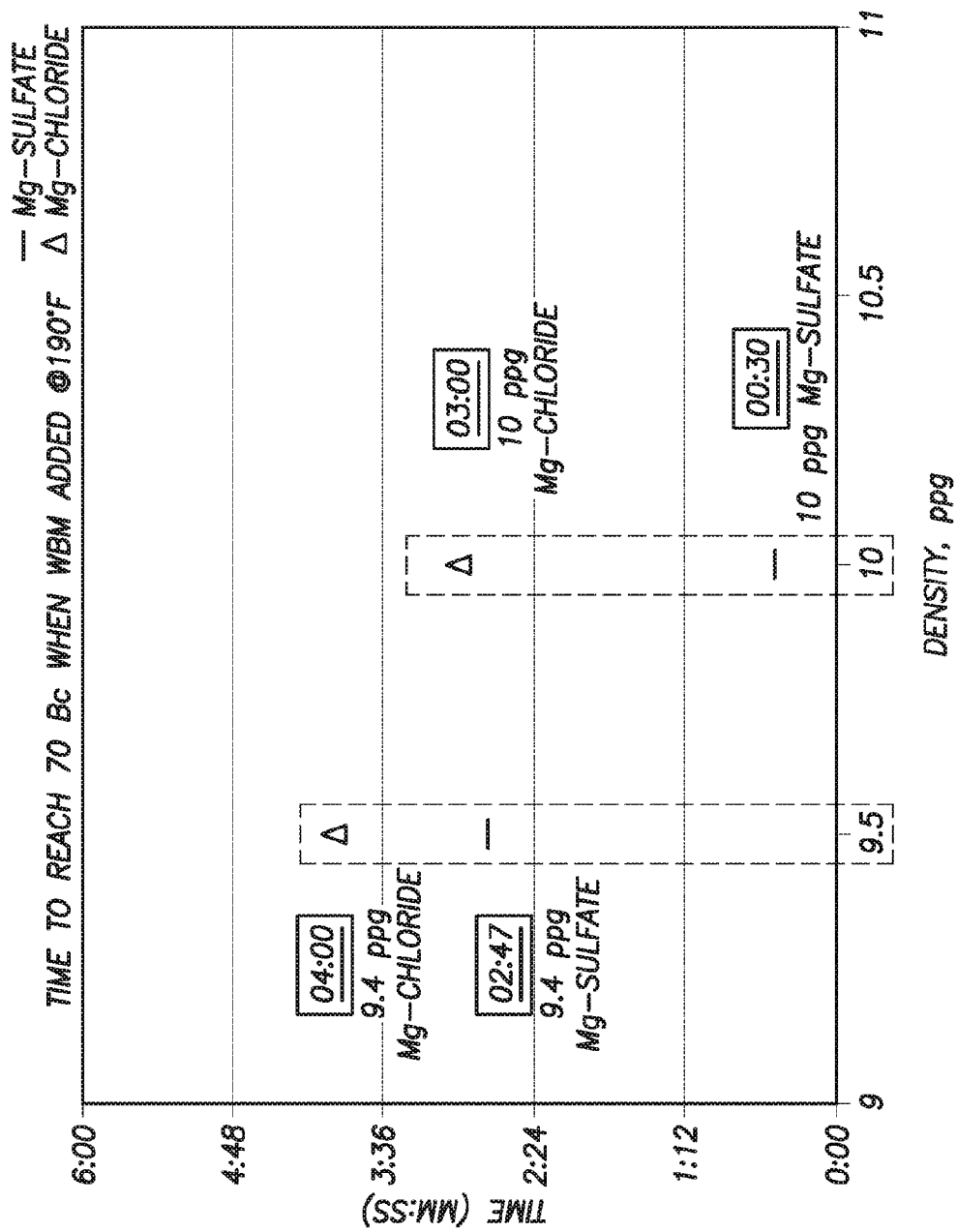
FIG. 7 is a plot illustrating the time required for treatment fluids to reach 70 Bearden consistency after a water-based mud was added at 190° F. in accordance with certain embodiments of the present disclosure.

FIG. 6 is a plot showing the initial Bearden consistency of each formulation at 190° F. FIG. 7 is a plot showing the time it took each formulation to reach 70 Bc after a water-based mud was added at 190° F. FIGS. 6 and 7 show, among other things, that the sulfate formulations appear to have better pumpability.

Figure 8:
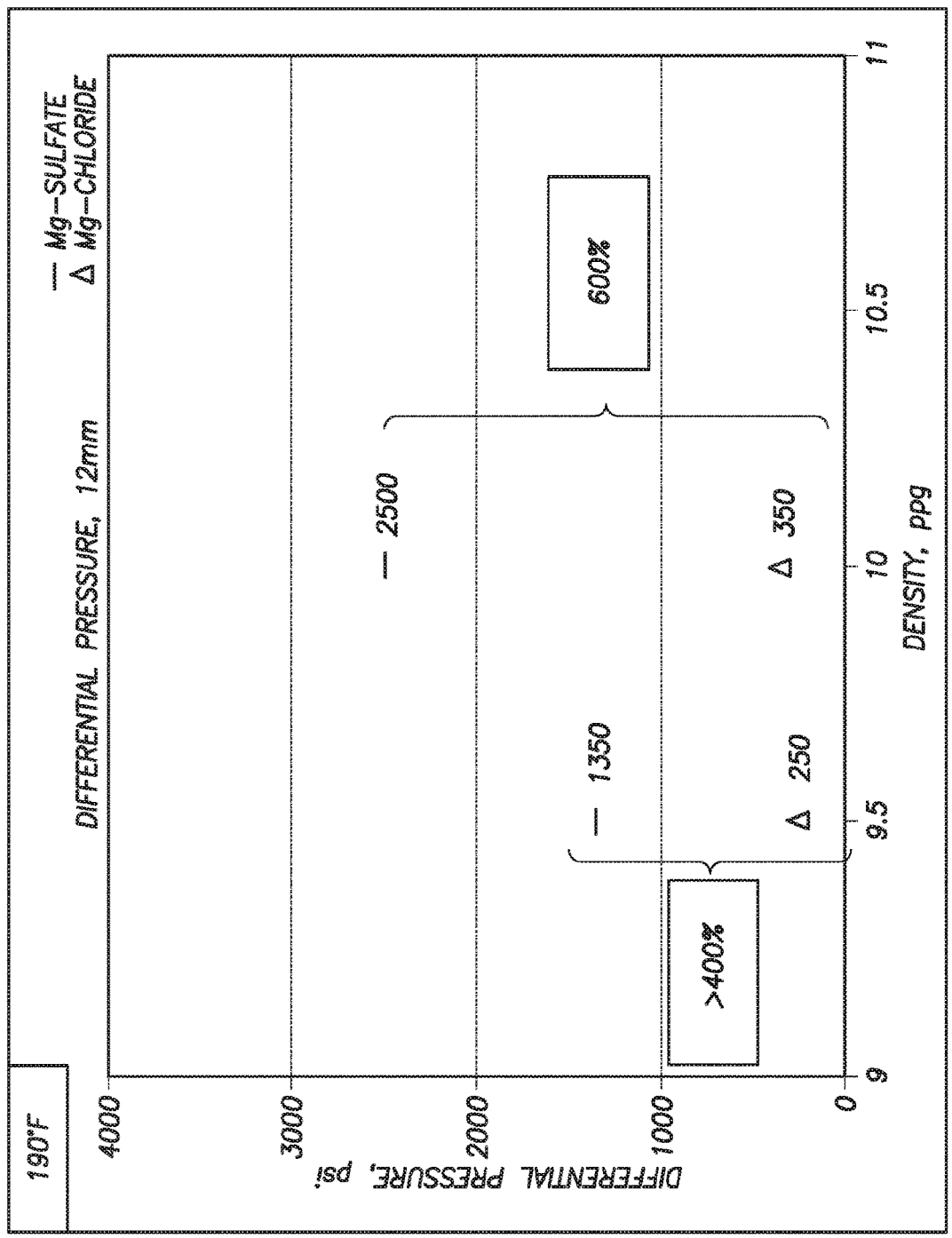
FIG. 8 is a plot illustrating the differential pressure that can be sustained by treatment fluids of the present disclosure at 190° F. for a testing apparatus with a 12 mm trim.
Figure 9:
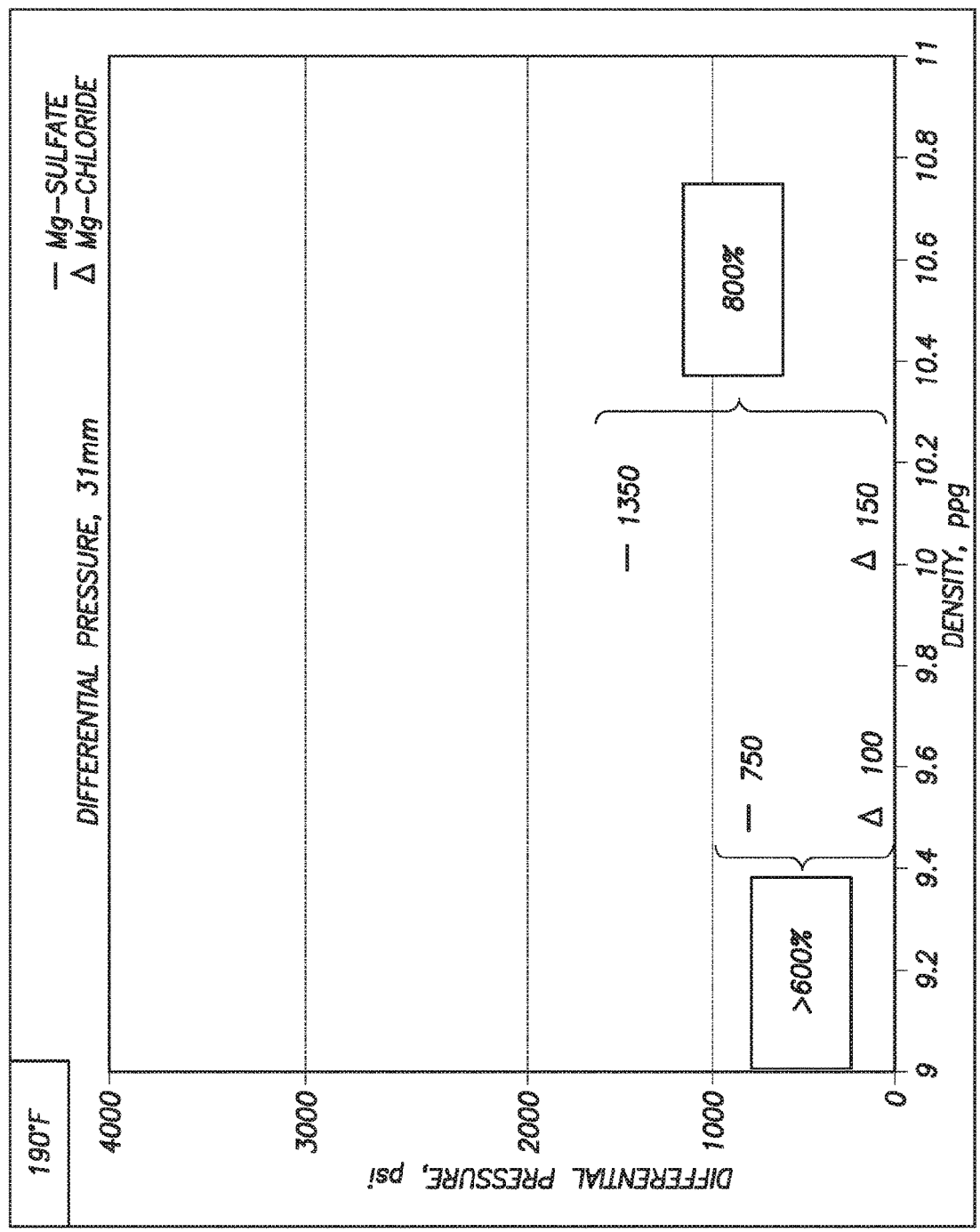
FIG. 9 is a plot illustrating the differential pressure that can be sustained by treatment fluids of the present disclosure at 190° F. for a testing apparatus with a 31 mm trim.
Figure 10:
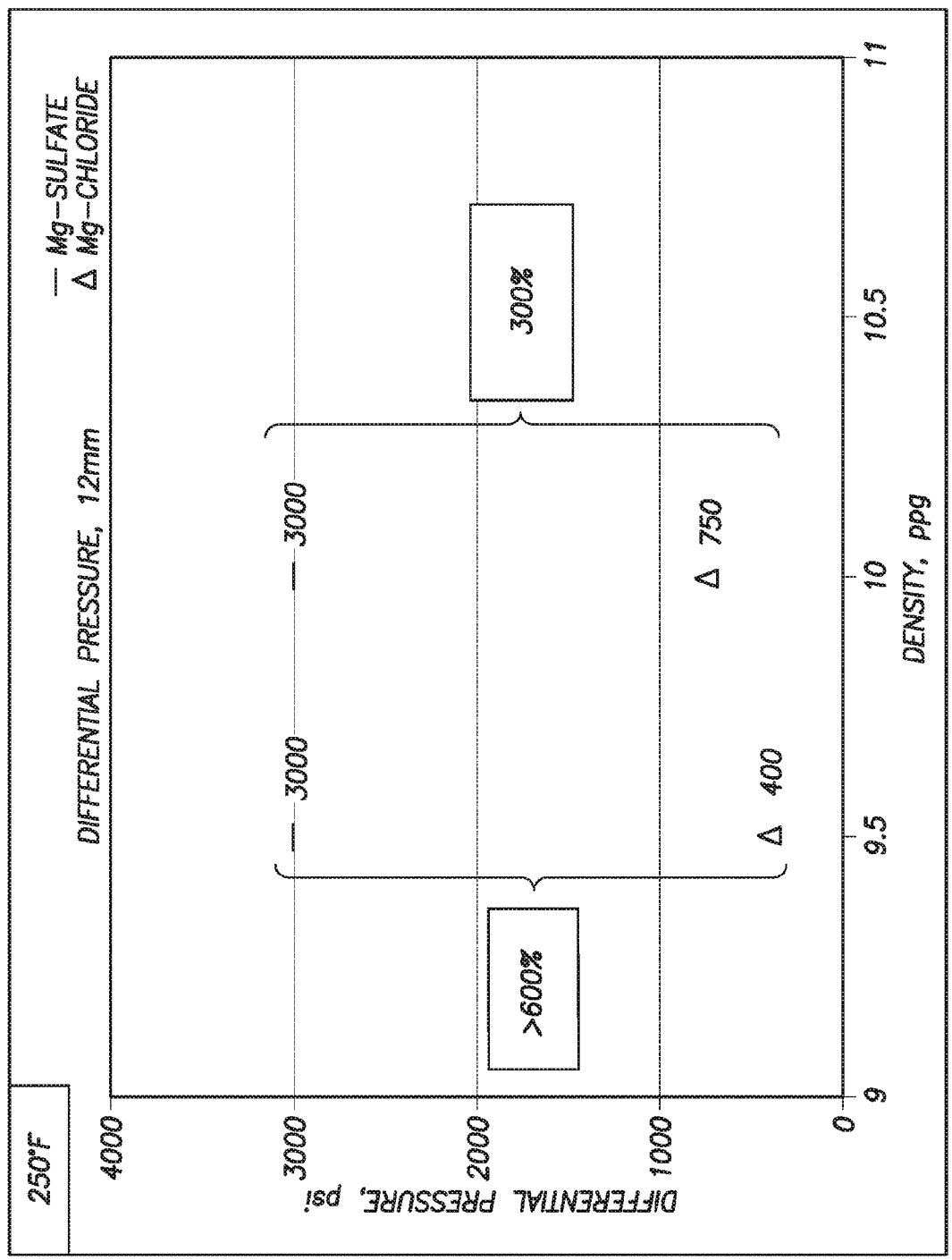
FIG. 10 is a plot illustrating the differential pressure that can be sustained by treatment fluids of the present disclosure at 250° F. for a testing apparatus with a 12 mm trim.
Figure 11:
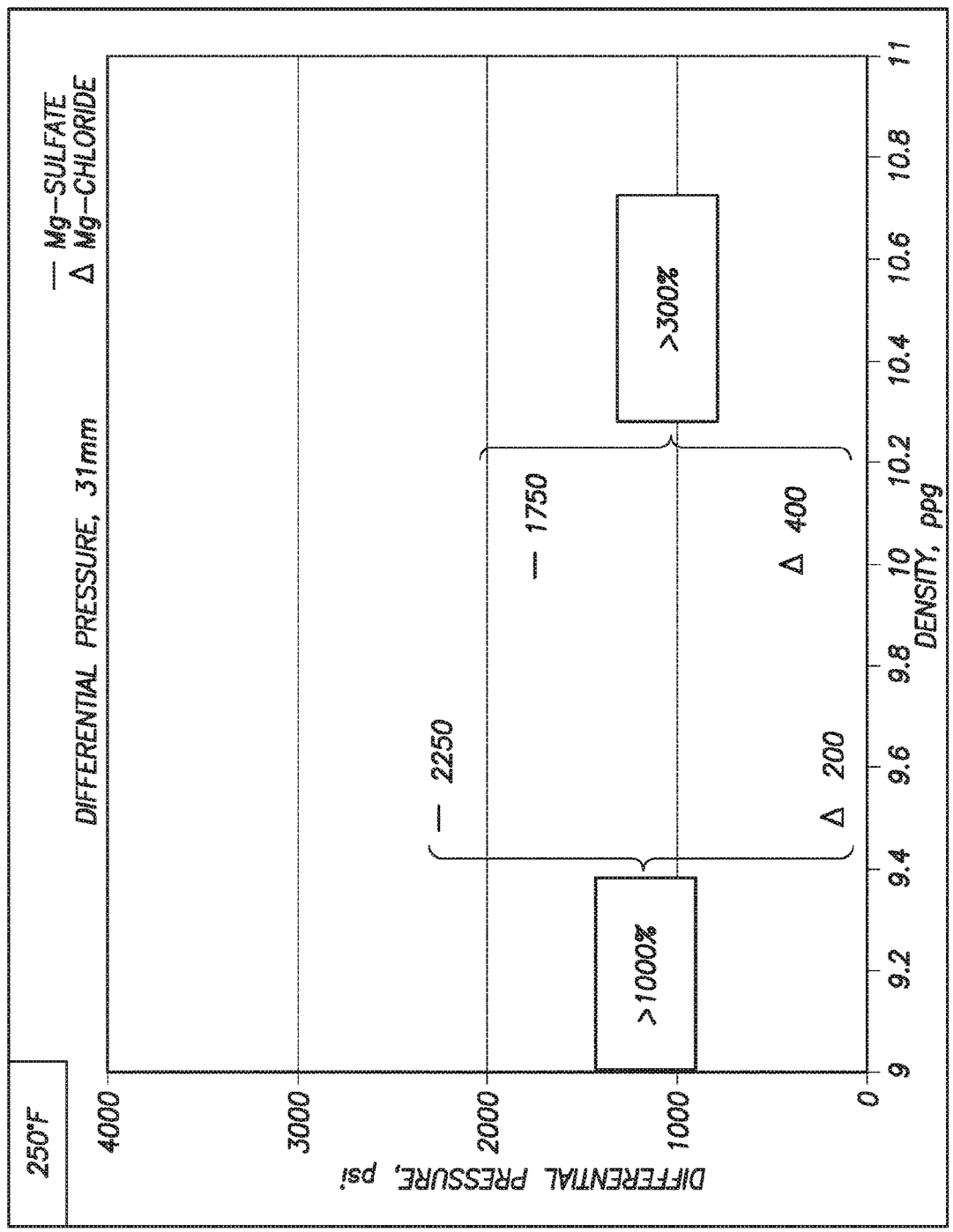
FIG. 11 is a plot illustrating the differential pressure that can be sustained by treatment fluids of the present disclosure at 250° F. for a testing apparatus with a 31 mm trim.

FIGS. 8 and 9 are plots illustrating the differential pressure that can be sustained by the compositions of Table 3 at 190° F. for a 12 mm trim and 31 mm trim, respectively. The compositions of Table 3 were placed in a PPA cell and allowed to cure, and then back pressure was applied using a hydraulic pump. Differential pressure was observed once the cured composition began moving up the PPA cell. FIGS. 10 and 11 are plots illustrating the differential pressure that can be sustained by the compositions of Table 3 at 250° F. for a 12 mm trim and 31 mm trim, respectively. FIGS. 8 through 11 illustrate, among other things, that the sulfate treatment fluids can sustain higher differential pressures than the chloride treatment fluids.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
   introducing a first treatment fluid comprising a first base fluid and a metal oxide into a wellbore penetrating at least a portion of a subterranean formation;
   introducing a spacer fluid into the wellbore that separates the first treatment fluid from at least a second treatment fluid;

introducing the second treatment fluid into the wellbore, wherein the second treatment fluid comprises a second base fluid and a soluble salt;

allowing the first treatment fluid to contact the second treatment fluid to form a cement mixture; and allowing the cement mixture to at least partially set.

2. The method of claim 1, wherein the cement mixture at least partially plugs a loss zone in the subterranean formation.

3. The method of claim 1, wherein at least one of the first treatment fluid and the second treatment fluid comprise a viscosifier.

4. The method of claim 3, wherein the viscosifier is an attapulgite clay.

5. The method of claim 1, wherein the first treatment fluid is introduced into the wellbore using one or more pumps.

6. The method of claim 1, wherein one or more properties of the spacer fluid introduced into the wellbore are determined based, at least in part, on a mixing model that simulates the interface behavior of the first treatment fluid, second treatment fluid, and spacer fluid.

7. The method of claim 1, wherein after allowing the first treatment fluid to contact the second treatment fluid, the cement mixture sets to a viscosity of about 70 Bc or higher in 60 minutes or less.

8. The method of claim 1, wherein the soluble salt is a sulfate salt.

9. The method of claim 8, wherein the sulfate salt is selected from the group consisting of: $MgSO_4$, $MgSO_4 \cdot 2H_2O$, $MgSO_4 \cdot 4H_2O$, $MgSO_4 \cdot 5H_2O$, $MgSO_4 \cdot 6H_2O$, $MgSO_4 \cdot 7H_2O$, $MgSO_4 \cdot 11H_2O$, and any combination thereof.

10. The method of claim 1, wherein the metal oxide includes particles sized from about 50 U.S. mesh to about 500 U.S. mesh.

11. The method of claim 1, wherein the metal oxide is magnesium oxide.

12. The method of claim 11, wherein the magnesium oxide is capable of reacting substantially completely with a 1N solution of aqueous acetic acid in under 40 seconds at around 28° C.

13. The method of claim 1, wherein the first treatment fluid is introduced into a flow path in the wellbore and the second treatment fluid is introduced into the flow path.

14. The method of claim 1, wherein the first base fluid is an aqueous fluid.

15. The method of claim 1, wherein the soluble salt is present in the second treatment fluid in an amount within a range of from about 0.1% to about 20% by weight of the second treatment fluid.

16. The method of claim 1, wherein the metal oxide is magnesium oxide, the soluble salt is $MgSO_4 \cdot 7H_2O$, and at least one of the first treatment fluid and second treatment fluid comprise an attapulgite clay.

17. A method comprising:

introducing a treatment fluid comprising a non-aqueous base fluid, magnesium oxide, a sulfate salt, and a viscosifier into a wellbore penetrating at least a portion of a subterranean formation comprising a loss zone;

allowing the treatment fluid to contact an aqueous fluid in the wellbore or the subterranean formation; and allowing the treatment fluid to at least partially set, wherein the treatment fluid at least partially plugs the loss zone.

18. The method of claim 17, wherein the viscosifier is an attapulgite clay.

19. A method comprising:

generating a mixing model for a well system comprising a wellbore penetrating at least a portion of a subterranean formation, a first treatment fluid comprising a first base fluid and magnesium oxide, at least one spacer fluid, and a second treatment fluid comprising a second base fluid and a soluble salt;

using the mixing model to determine one or more properties of at least one of the first treatment fluid, second treatment fluid, and the at least one spacer fluid, wherein the mixing model simulates the interface behavior of the first treatment fluid, second treatment fluid, and spacer fluid; and performing a treatment operation for the well system based, at least in part, on the one or more properties, wherein the treatment operation comprises:

introducing the first treatment fluid into the wellbore;

introducing the at least one spacer fluid into the wellbore to separate the first treatment fluid from the second treatment fluid;

introducing the second treatment fluid into the wellbore;

allowing the first treatment fluid to contact the second treatment fluid to form a cement mixture; and allowing the cement mixture to at least partially set.

20. The method of claim 19, wherein using the mixing model to determine one or more properties comprises calculating the one or more properties that result in the least amount of mixing of the first treatment fluid, second treatment fluid, and spacer fluid.

* * * * *